US012291669B2

(12) United States Patent
Pisklak et al.

(10) Patent No.: US 12,291,669 B2
(45) Date of Patent: May 6, 2025

(54) LIQUID SALT ACTIVATOR AND METHODS OF MAKING AND USING SAME

(71) Applicant: Halliburton Energy Services, Inc., Houston, TX (US)

(72) Inventors: Thomas Jason Pisklak, Houston, TX (US); William Cecil Pearl, Jr., Houston, TX (US); Samuel J. Lewis, Houston, TX (US); Claudia Pineda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 253 days.

(21) Appl. No.: 17/512,307

(22) Filed: Oct. 27, 2021

(65) Prior Publication Data
US 2023/0126770 A1 Apr. 27, 2023

(51) Int. Cl.
| | |
|---|---|
| *C09K 8/467* | (2006.01) |
| *C04B 22/06* | (2006.01) |
| *C04B 22/12* | (2006.01) |
| *C04B 22/14* | (2006.01) |
| *C04B 24/16* | (2006.01) |
| *C04B 28/02* | (2006.01) |
| C04B 103/10 | (2006.01) |
| C04B 103/40 | (2006.01) |

(52) U.S. Cl.
CPC ............ *C09K 8/467* (2013.01); *C04B 22/064* (2013.01); *C04B 22/124* (2013.01); *C04B 22/147* (2013.01); *C04B 24/163* (2013.01); *C04B 28/02* (2013.01); *C04B 2103/10* (2013.01); *C04B 2103/40* (2013.01)

(58) Field of Classification Search
CPC ..... C09K 8/467; C04B 22/064; C04B 22/124; C04B 22/147; C04B 24/163; C04B 28/02; C04B 2103/10; C04B 2103/40
USPC ......................................................... 523/130
See application file for complete search history.

(56) References Cited

U.S. PATENT DOCUMENTS

| | | | |
|---|---|---|---|
| 8,333,240 B2 | 12/2012 | Roddy et al. | |
| 10,961,428 B1 | 3/2021 | Pisklak et al. | |
| 11,078,400 B2 | 8/2021 | Pisklak et al. | |
| 2011/0308799 A1* | 12/2011 | Tarafdar | C09K 8/487 166/293 |

(Continued)

FOREIGN PATENT DOCUMENTS

WO WO-2015035281 A1 * 3/2015 ........... C04B 14/062

OTHER PUBLICATIONS

Halliburton, Material Safety Data Sheet of SA-1015, Apr. 12, 2013. (Year: 2013).*

*Primary Examiner* — David T Karst
(74) *Attorney, Agent, or Firm* — Conley Rose, P.C.; Rodney B. Carroll

(57) ABSTRACT

Disclosed herein is a liquid salt activator comprising a salt, a suspending aid, and water, wherein the salt is present in the liquid salt activator in an amount of from about 5 wt. % to about 95 wt. %, based on the total weight of the liquid salt activator. Also disclosed herein is an activated extended life slurry (ELS) composition comprising a hydraulic cement, a supplementary cementitious material, the liquid salt activator, and an aqueous fluid. The activated ELS composition can be used in a method of servicing a wellbore penetrating a subterranean formation.

22 Claims, 4 Drawing Sheets

(56) References Cited

U.S. PATENT DOCUMENTS

2018/0230357 A1* 8/2018 Haydon ................ C04B 22/147
2019/0367796 A1 12/2019 Pisklak et al.

* cited by examiner

LIQUID SALT ACTIVATOR AND METHODS OF MAKING AND USING SAME

FIELD

This application relates to the recovery of natural resources from a wellbore penetrating a subterranean formation, and more specifically this application relates to a liquid composition that can be used in wellbore servicing fluids.

BACKGROUND

This disclosure relates generally to a liquid composition. More specifically, it relates to a liquid salt activator and using of the liquid salt activator in a wellbore servicing fluid for treating a wellbore penetrating a subterranean formation, for example during a cementing operation.

Natural resources such as gas, oil, and water residing in a subterranean formation are usually recovered by drilling a wellbore down to the subterranean formation while circulating a drilling fluid, also referred to as drilling mud, in the wellbore. After terminating circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass sheath) to thereby attach the string of pipe to the galls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

While cement slurries have been developed heretofore, challenges continue to exist with the successful use of cement slurries in subterranean cementing operations. For example, one challenge in well cementing is the development of satisfactory mechanical properties in a cement slurry within a desired time period. Oftentimes additives are added to cement slurries to meet the requirements. Therefore, an ongoing need exists for an additive that can be prepared, stored, and added to a cement slurry to control setting time of the cement slurry.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

SUMMARY

Figure 1:
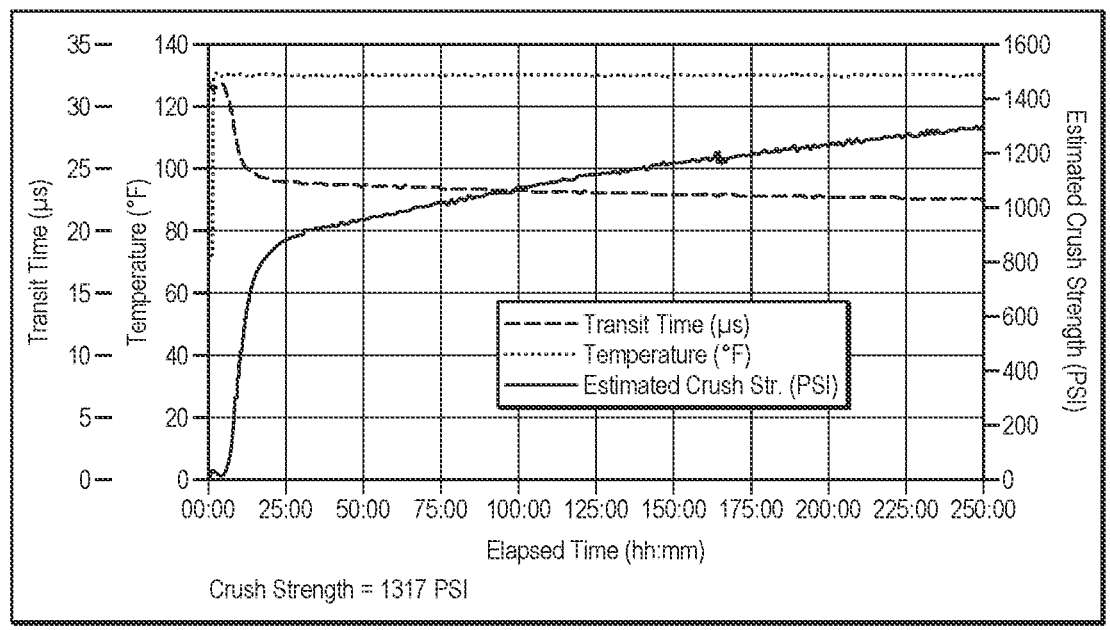
FIG. 1 is an ultrasonic cement analyzer (UCA) chart of a sample in an experiment.

Disclosed herein is a liquid salt activator for an extended life cementitious slurry (ELS) comprising a salt, a suspending aid, and water, wherein the salt is present in the liquid salt activator in an amount of from about 5 wt. % to about 95 wt. %, based on the total weight of the liquid salt activator.

Also disclosed herein is an activated extended life cementitious slurry (ELS) composition comprising: a hydraulic cement, an aqueous fluid, and a liquid salt activator comprising a salt, a suspending aid, and water, wherein the salt is present in the liquid salt activator in an amount of from about 5 wt. % to about 95 wt. %, based on the total weight of the liquid salt activator.

Also disclosed herein is a cementitious composition comprising a cementitious material, a liquid salt activator comprising a salt, a suspending aid, and water, wherein the salt is present in the liquid salt activator in an amount of from about 5 wt. % to about 95 wt. %, based on the total weight of the liquid salt activator, and an aqueous fluid.

Also disclosed herein is a multiphasic salt system comprising a liquid salt activator comprising a salt, a suspending aid, and water, wherein the salt is present in the liquid salt activator in an amount of from about 5 wt. % to about 95 wt. %, based on the total weight of the liquid salt activator, wherein the liquid salt additive is suspended in a saturated salt solution.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a liquid salt composition (e.g., a liquid salt activator) comprising a salt, a suspending aid, and water. The liquid salt activator can be in a form of fluid (e.g., a suspension, a slurry). In embodiments, the salt is present in the liquid salt activator in an amount of from about 5 wt. % to about 95 wt. %, based on the total weight of the liquid salt activator, alternatively from about 10 wt. % to about 80 wt. %, alternatively from about 20 wt. % to about 80 wt. %, alternatively from about 30 wt. % to about 80 wt. %, alternatively from about 40 wt. % to about 75 wt. %, alternatively from about 50 wt. % to about 70 wt. %, alternatively from about 60 wt. % to about 70 wt. %, or alternatively from about 65 wt. % to about 70 wt. %, In some embodiments, the salt is present in the liquid salt activator in an amount of from about 60 wt. % to about 80 wt. % based on the total weight of the liquid salt activator. In some embodiments, the salt is present in the liquid salt activator in an amount of from about 65 wt. % to about 75 wt. % based on the total weight of the liquid salt activator. In some embodiments, the salt is present in the liquid salt activator in an amount of from about 66 wt. % to about 72 wt. % based on the total weight of the liquid salt activator.

The salt in the liquid salt activator can be any suitable salt. In embodiments, the salt comprises chloride, sulfate; phosphate, bromide; bicarbonate, acetate, formate, and carbonate salts of lithium, potassium, sodium, calcium, magnesium, zinc, iron, or combinations thereof. Without being limited by theory, a portion of the salt can be dissolved in the water in the liquid salt activator; and at least a portion of the salt can be suspended in the water with help of the suspending aid. In some embodiments, the salt comprises sodium chloride and sodium sulfate. The weight ratio of sodium chloride to sodium sulfate can be from about 1:9 to about 9:1, alternatively from about 1:9 to about 5:1, alternatively from about 1:5 to about 5:1, alternatively from about 1:3 to about 3:1, or alternatively from about 1:2 to about 2:1.

The liquid salt activator can comprise a suspending aid. A suspending aid is a substance that is added to fluids to promote particle suspension or dispersion and reduce sedimentation. Without being limited by theory, the suspending aid disclosed herein can promote suspension of at least a portion of the salt.

The suspending aid can be any suitable material. In embodiments, the suspending aid comprises a synthetic polymer (e.g., a polyacrylamide, a cellulose derivative), a biopolymer (e.g., a cellulose, Xanthan, scleroglucan polysaccharides), or a combination thereof. Examples of cellulose derivatives suitable for use in the present disclosure include without limitation carboxyethylcellulose, carboxymethylcellulose, carboxymethylhydroxyethylcellulose, alkylhydroxyalkylcellulose, alkycellulose; alkylcarboxy-alkylcellulose, hydroxyethylcellulose, and other hydroxyalkylcelluloses. In some embodiments, the suspending aid comprises a water-soluble polymer. Herein a "water-soluble polymer" is defined as a polymer that dissolves, disperses, or swells in water, with a solubility of equal to or greater than about 0.01 wt. % based on the total weight of the polymer and water at about 70° F. In embodiments, the suspending aid comprises a polyacrylamide-based polymer.

In embodiments, the suspending aid is polymerized from monomers selected from the group consisting of vinyl pyrrolidone, 2-Acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamide-2-tert.-butyl sulfonic acid (ATBS), N,N-dimethylaniline, pentaerythritol allyl ether, methylenebisacrylamide, divinyl ether, diallyl ether, vinyl ethers of polyglycols, vinyl ethers of polyols, allyl ethers of polyglycols, allyl ethers of polyols, divinylbenzene, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, diallyldimethylammonium chloride, epichlorohydrin, epichhaiohydrin, diepoxides, dialdehydes, trimethyolpropane triacrylate, pentaerythritol tetraacrylate, divinyl sulphone, carbodiimide, glutraldehyde, acryloylmorpholine, N-vinyl-N-methylaceamide, N-vinylformamide, N-vinylpyrrolidone, acrylonitrile, actylomorpholine, maleic anhydride, and combinations thereof. In embodiments, the suspending aid comprises a copolymer of AMPS.

The suspending aid can have an average molecular weight of from equal to or greater than about 50,000 Daltons (Da) to equal to or less than about 5,000,000 Da, alternatively from equal to or greater than about 50,000 Da to equal to or less than about 4,000,000 Da, alternatively from equal to or greater than about 50,000 Da to equal to or less than about 3,000,000 Da, alternatively from equal to or greater than about 50,000 Da to equal to or less than about 2,000,000 Da, alternatively from equal to or greater than about 50,000 Da to equal to or less than about 1,500,000 Da, or alternatively from equal to or greater than about 50,000 Da to equal to or less than about 1,000,000 Da. The suspending aid can be present in the liquid salt activator in an amount of from about 0.05 wt. % to about 20.0 wt. %, based on the total weight of the liquid salt activator, alternatively from about 0.05 wt. % to about 15.0 wt. %, alternatively from about 0.05 wt. % to about 10.0 wt. %, alternatively from about 0.05 wt. % to about 7.0 wt. %, alternatively from about 0.05 wt. % to about 5.0 wt. %, alternatively from about 0.5 wt. % to about 5.0 wt. %, alternatively from about 1.0 wt. % to about 5.0 wt. %, or alternatively from about 2.0 wt. % to about 4.0 wt. %. In some embodiments, the suspending aid is present in the liquid salt activator in an amount of from about 1.0 wt. % to about 4.0 wt. % based on the total weight of the liquid salt activator. In some embodiments, the suspending aid is present in the liquid salt activator in an amount of from about 2.0 wt. % to about 3.0 wt. % based on the total weight of the liquid salt activator. In some embodiments, the suspending aid is present in the liquid salt activator in an amount of from about 2.5 wt. % to about 3.0 wt. % based on the total weight of the liquid salt activator.

The liquid salt activator can comprise water. Generally, the water may be from any source, provided that it does not contain an amount of components that may undesirably affect the other components in the liquid salt activator. For example, the water can be selected from a group consisting essentially of fresh water, surface water, ground water, produced water, salt water, sea water, brine (e.g., underground natural brine, formulated brine, etc.), and combinations thereof. A formulated brine may be produced by dissolving one or more soluble salts in water, a natural brine, or seawater. Representative soluble salts include the chloride, bromide, acetate, and formate salts of potassium, sodium, calcium, magnesium, and zinc. The water can be present in the liquid salt activator in an amount effective to provide a slurry having desired (e.g., job or service specific) rheological properties. In embodiments, the water is present in the liquid salt activator in an amount of from about 5 wt. % to about 95 wt. %, based on the total weight of the liquid salt activator, alternatively from about 5 wt. % to about 75 wt. %, alternatively from about 5 wt. % to about 60 wt. %, alternatively from about 5 wt. % to about 50 wt. %, alternatively from about 5 wt. % to about 40 wt. %, or alternatively from about 10 wt. % to about 35 wt. %.

A liquid salt activator of the type disclosed herein can be prepared using any suitable method. In embodiments, the method comprises placing components of the liquid salt activator (e.g., a salt, water) into a suitable container (e.g., a mixer, a blender) and blending to form a pumpable slurry (e.g., a homogeneous fluid). The container can be any container that is compatible with the components of the liquid salt activator and has sufficient space. A blender or mixer can be used for blending/mixing, the components of the liquid salt activator. After preparation, the liquid salt activator can be stored in the container or a storage container.

The liquid salt activator disclosed herein can have any suitable density, including, but not limited to, in a range of from about 9 lb/gal (ppg) to about 25 ppg, alternatively from about 9 ppg to about 22 ppg, alternatively from about 10 ppg to about 20 ppg, or alternatively from about 11 ppg to about 20 ppg.

The liquid salt activator can have free fluid in a range of from about 0 vol. % to about 10 vol. % based on the total volume of the liquid salt activator, alternatively from about 0 vol. % to about 8 vol. %, alternatively from about 0 vol. % to about 5 vol. %, or alternatively from about 0 vol. % to about 4 vol. %, after being static at about 70° F. for about 1 week to about 7 weeks from preparation of the liquid salt activator. Free fluid refers to a fluid that separates from a fluid body that contains major amounts of salt after the liquid salt activator is prepared and kept static for a certain period of time.

In one or more embodiments, the liquid salt activator may be included in a cementitious composition in order to activate that composition. The cementitious material in the cementitious composition may comprise a hydraulic cement that sets and hardens by reaction with water. Examples of hydraulic cements include but are not limited to Portland cements (e.g., classes A, B, and Portland cements), pozzolana cements, gypsum cements, phosphate cements, high alumina content cements, silica cements, high alkalinity cements, acid/base cements, magnesia cements such as Sorel cements, micro-fine cement, and combinations thereof.

In embodiments, the cementitious composition is an activated extended life slurry (ELS) composition (also referred to as set-delayed or passivated cement compositions), which is an ELS composition that is activated by the liquid salt activator disclosed herein. The ELS composition can comprise a hydraulic cement and an aqueous fluid. In some embodiments, the ELS composition further comprises a supplementary cementitious material. The ELS composition is characterized as being able to be stored in a pumpable fluid state for at least one day (e.g., at least about (day, about 2 weeks, about 2 years or more) at room temperature (e.g., about 80° F.) in quiescent storage. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

An ELS composition may be activated (e.g., by combination with an activator, such as the liquid salt activator disclosed herein) to set into a hardened mass. The term "cement set activator" or "activator", as used herein, refers to an additive that activates an ELS composition such that the ELS composition sets to form a hardened mass. In embodiments, the activator comprises the liquid salt activa-tor. An ELS composition comprising an activator may be referred to as an activated ELS composition. The activated ELS composition can comprise a hydraulic cement, an aqueous fluid, and the liquid salt activator of the type disclosed herein. In some embodiments, the activated ELS composition further comprises a supplementary cementitious material. The liquid salt activator can be present in a cementitious composition (e.g., the activated ELS composition) in an amount of from about 0.001 wt. % to about 50 wt. % based on the total weight of the cementitious composition (e.g., the activated ELS composition), alternatively from about 0.5 wt. % to about 50 wt. %, or alternatively from about 5 wt. % to about 50 wt. %. In some embodiments, the liquid salt activator can be present in a cementitious composition (e.g., the activated ELS composition) in an amount of from about 0.5% to about 50% by weight of dry blend (% bwob) of the cementitious composition (e.g., the activated ELS composition), alternatively from about 5% to about 50%, alternatively from about 10% to about 50%, or alternatively from about 10% to about 45%. The dry blend of the activated ELS composition (or the cementitious composition), also referred to as a dry blend of cementitious components, can include the hydraulic cement, the supplementary cementitious material, and other cementitious materials (e.g., hydrated lime).

A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In embodiments, "high alumina content cement" refers to a cement having an alumina concentration in the range of from about 40 wt. % to about 80 wt. % by a weight of the high alumina content cement. Silica cement can be formed when phosphoric acid displaces metal ions from an alumina—silica glass, containing metal oxides and fluorides. Portland cements can be classified as Classes A, C, H, and G cements according to American Petroleum institute, *API Specification for Materials and Testing for Well Cements*, API Specification 10, Fifth Ed Jul. 1, 1990. In addition, hydraulic cements may include cements classified by American Society for Testing and Materials (ASTM) C150 (Standard Specification for Portland Cement), 0595 (Standard Specification for Blended Hydraulic Cement) or C1157 (Performance Specification for Hydraulic Cements) such as those cements classified as ASTM Type I, II, III, IV, or V.

The hydraulic cement may be included in the activated ELS composition in any amount suitable for a particular application. Without limitation, the hydraulic cement may be included in the activated ELS composition in an amount in the range of from about 10% to about 80% by weight of dry blend (% bwob) of the activated ELS composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of dry blend of the activated ELS composition.

The activated ELS composition may include supplementary cementitious materials. The supplementary cementitious material may be any material that contributes to the compressive strength of the activated ELS composition. Some supplementary cementitious materials may include, without limitation, fly ash, blast furnace slag, silica fume, pozzolans, kiln dust, and clays, for example. Although only some supplementary cementitious materials are disclosed herein, one of ordinary skill in the art, with the benefit of this disclosure, should be able to readily recognize if a material may be suitable to include in an activated ELS composition as a supplementary cementitious material.

For example, the activated ELS composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln teed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include valving amounts of free lime and flee magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the activated ELS composition prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the activated ELS composition in an amount suitable for a particular application.

In some examples, the activated ELS composition may further include one or more of slag, natural glass, shale, amorphous silica, or metakaolin as a supplementary cementitious material. Slag is generally a granulated, blast furnace by-product from the production of cast iron including the oxidized impurities found in iron ore. The activated ELS composition may further include perlite. Polite is an ore and generally refers to a naturally occurring volcanic, amorphous siliceous rock including mostly silicon dioxide and aluminum oxide. The perlite may be expanded, and/or unexpanded as suitable for a particular application. The expanded or unexpanded perlite may also be ground, for example. The activated ELS composition may further include shale. A variety of shales may be suitable, including those including silicon, aluminum, calcium, and/or magnesium. Examples of suitable shales include vitrified shale and/or calcined shale.

In some examples, the activated ELS composition may further include amorphous silica as a supplementary centententious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process.

In some examples, the activated ELS composition may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed Jul. 1, 1990. In some examples, the activated ELS composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the activated ELS composition. For example, without limitation, one or more supplementary cementitious materials may be present in an amount of about 0.1% to about 80% by weight of dry blend (% bwob) of the activated ELS composition. For example, the perlite may be present in an amount ranging between any of and/or including any of about 0.1%, about 10%, about 20%, about 30%, about 40%, about 50%, about 60%, about 70%, or about 80% by weight of dry blend of the activated ELS composition.

The activated ELS composition can comprise an aqueous fluid. Generally, the aqueous fluid may be from any source, provided that it does not contain an amount of components that may undesirably affect the other components in the activated ELS composition. For example, the aqueous fluid can be selected from a group consisting essentially of fresh water, surface water, ground water, produced water, salt water, sea water, brine (e.g., underground natural brine, formulated brine, etc.), and combinations thereof. A formulated brine may be produced by dissolving one or more soluble salts in water, a natural brine, or seawater. Representative soluble salts include the chloride, bromide, acetate, and formate salts of potassium, sodium, calcium, magnesium, and zinc. The aqueous fluid be present in the activated ELS composition in an amount effective to provide a slurry having desired (e.g., job or service specific) theological properties. In embodiments, the aqueous fluid is present in the activated ELS composition in an amount of from about 33% to about 200% based on the total weight of dry blend of the activated. ELS composition, alternatively from about 40% to about 200%, or alternatively from about 50% to about 200% by weight of dry blend of the activated ELS composition.

In some examples, the activated ELS composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the activated ELS composition, for example, to form a hydraulic composition with the supplementary cementitious material. For example, a weight ratio of the supplementary cementitious material to the hydrated lime is about 10:1 to about 1:1, alternatively about 8:1 to about 2:1, or alternatively about 3:1 to about 5:1. Where present, the hydrated lime may be included in the set activated ELS composition in an amount in the range of from about 10% to about 100% by weight of dry blend of the activated ELS composition, for example. In some examples, the hydrated lime may be present in an amount ranging between any of and/or including any of about 10%, about 20%, about 40%, about 60%, about 80%, or about 100% by weight of dry blend of the activated ELS composition. In some examples, the cementitious components present in the activated composition may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

In embodiments, the activated ELS composition further comprises one or more additives. The one or more additives can comprise weighting agents, retarders, accelerators, activators, gas control additives, lightweight additives, gas-generating additives, mechanical-property-enhancing additives (e.g., carbon fibers, glass fibers, metal fibers, minerals fibers, polymeric elastomers, latexes, etc.), lost-circulation materials, filtration-control additives, fluid-loss-control additives, defoaming agents, foaming agents, transition time modifiers, dispersants, thixotropic additives, suspending agents, or combinations thereof. One having ordinary skill in the art, with the benefit of this disclosure, should be able to select one or more appropriate additives for a particular application.

The one or more additives can be included in the activated ELS composition in any suitable amounts. In embodiments, the one or more additives are present in the activated ELS composition in an amount of from about 0.01% to about 25% based on the total weight of the dry blend of the activated ELS composition, alternatively from about 0.01% to about 20%, or alternatively from about 0.01% to about 15%.

It is contemplated that a cementitious composition prepared for introduction to a wellbore whether as a dry blend that is contacted with the appropriate additives and fluids or as an ELS composition, either of which may be activated by the liquid salt activator of the present disclosure, would have similar fluid and set cement characteristics. Consequently, the following properties and methods of preparation and use, for simplicity refer to the activated ELS composition but are also applicable to a cementitious composition that is not an activated ELS composition.

The activated ELS composition disclosed herein can have any suitable density, including, but not limited to, in a range of from about 4.0 lb/gal (ppg) to about 25.0 ppg, alternatively from about 6.0 ppg to about 22.0 ppg, alternatively from about 10.0 ppg to about 20.0 ppg, or alternatively from about 12.0 ppg to about 20.0 ppg.

In some examples, the activated ELS composition may set to have a desirable compressive strength. Compressive strength is generally the capacity of a material or structure to withstand axially directed pushing forces. The compressive strength may be measured at a specified time after the LS composition has been activated and the resultant activated ELS composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the activated ELS composition may develop a 24-hour compressive strength in the range of from about 1,000 psi to about 5,000 psi, alternatively from about 1,500 psi to about 5,000 psi, or alternatively horn about 2,000 psi to about 5,000 psi. In some examples, the activated ELS composition may develop a compressive strength in 24 hours of at least about 1,000 psi, at least about 1,200 psi, at least about 1,500 psi, or more. In some examples, the compressive strength values may be determined using destructive or non-destructive methods at a temperature ranging from 100° F. to 200° F. For example, the compressive strength values may be determined at about 160° F.

In embodiments, the activated ELS composition has a crush strength of from about 100 psi to about 2,700 psi at about 160° F. in a crush test when measured in accordance with test standard API-RP-10-2, alternatively from about 1,800 psi to about 2,500 psi, alternatively from about 2,000 psi to about 2,500 psi, or alternatively from about 2,200 psi to about 2,500 psi. A crush strength is the compressive strength at the onset of failure in a crush test, which is a destructive method. A crush test can be performed in a Tinius-Olsen load frame.

In embodiments, the activated ELS composition has a time to reach 50 psi (345 kPa) compressive strength measured in an ultrasonic cement analyzer (UCA) test in accordance with test standard API-RP-10B-2. The time to reach 50 psi under static conditions in a UCA can be used as an estimation of the initial set time of the activated ELS composition. The time to 50 psi may be the time it takes for a cement slurry to transition from a pumpable fluid state to a hardened set state.

In embodiments, the activated ELS composition prepared has a time to reach 50 psi compressive strength in a range of from about 8 hours to about 20 hours at about 160° F. in a UCA test, alternatively from about 9 hours to about 20 hours, alternatively from about 10 hours to about 20 hours, alternatively from about 12 hours to about 20 hours, or alternatively from about 12 hours to about 18 hours, when measured in accordance with test standard API-RP-10B-2.

The activated ELS composition may have desirable thickening times. Thickening time typically refers to the time a fluid, such as the activated ELS composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Be and may be reported as the time to reach 70 Bc. In some embodiments, the activated ELS composition may have a thickening time of greater than about 1 hour, alternatively greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F. In embodiments, the activated ELS composition may have a thickening time in a range of from about 6 hours to about 10 hours at about 130° F. and 3,000 psi, when measured in accordance with test standard API-RP-1013-2.

In some embodiments, the activated ELS composition is used at temperature in a range of from about 50° F. to about 400° F., alternatively from about 50° F. to about 375° F., alternatively from about 50° F. to about 350° F., alternatively from about 50° F. to about 325° F. or alternatively from about 50° F. to about 300° F.

Figure 3:
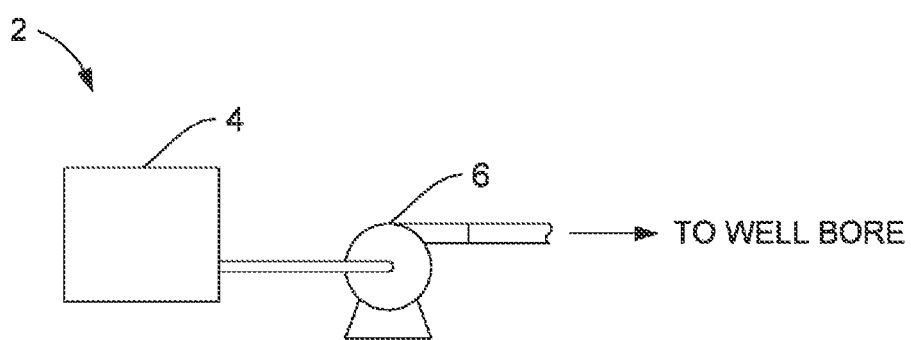
FIG. 3 is a system for the preparation and delivery of an activated extended life slurry (ELS) composition to a wellbore in accordance with certain embodiments.

An activated ELS composition of the type disclosed herein can be prepared using any suitable method. FIG. 3 illustrates a system 2 for the preparation of an activated ELS composition and subsequent delivery to a wellbore in accordance with certain embodiments. As shown, the activated ELS composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks. In some embodiments, a jet mixer may be used, for example, to continuously mix components of the activated ELS composition (e.g., a hydraulic cement, an aqueous fluid) as it is being pumped to the wellbore. In embodiments, a re-circulating mixer and/or a batch mixer may be used to mix components of the ELS composition (e.g., the hydraulic cement, the one or more additives, the aqueous fluid), and the liquid salt activator may be added to the mixer prior to pumping the activated ELS composition downhole. Additionally, batch mixer type units for the ELS composition may be plumbed in line with a separate tank containing the liquid salt activator. The liquid salt activator may then be fed in-line with the ELS composition as it is pumped out of the mixing unit.

Figure 4:
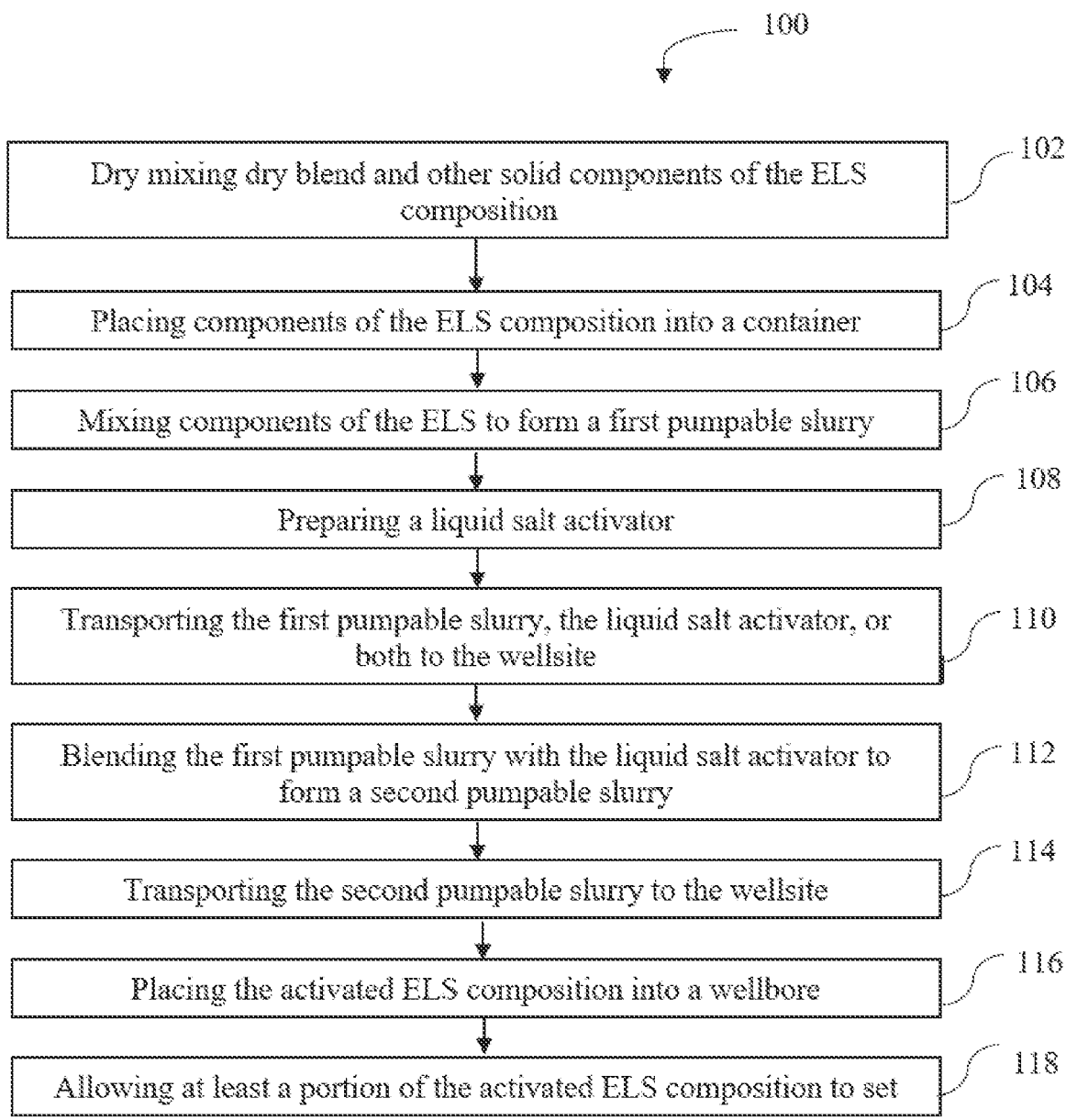
FIG. 4 is a flow chart of a method in accordance with some embodiments of the disclosure.

FIG. 4 illustrates a flow chart of a method 100 according to some embodiments in the present disclosure. In embodiments, the method 100 comprises block 106, which comprises mixing the components of the ELS composition to form a first pumpable slurry (e.g., a homogeneous fluid). Mixing equipment (e.g., a blender or mixer) can be used for mixing the components of the ELS composition. The first pumpable slurry herein can comprise the ELS composition.

Prior to block 106, the method 100 can comprise an optional block 104, which comprises placing components of the ELS composition (e.g, the hydraulic cement, an aqueous fluid) into a container (e.g., a mixer, a blender). The container can be any container that is compatible with the components and has sufficient space for the components. Prior to block 104, the method 100 can further comprise an optional block 102, in which the dry blend and other solid components (e.g., a weighting agent) of the ELS composition can be dry mixed. Dry-mixing equipment (e.g., a mixing head of a solid feeding system, a dry-mixing container) can be used for dry mixing. The dry-mixing container can be any container that is compatible with the ELS composition and optional other solid components and has sufficient space. A blender can be used for dry mixing.

In embodiments, the method 100 comprises block 108, which comprises preparing a liquid salt activator using the method disclosed in the present disclosure. Block 108 can be prior to or after block 106. In embodiments, the method 100 further comprises block 112, which comprises blending the first pumpable slurry with the liquid salt activator to form a second pumpable slurry (e.g., a homogeneous fluid). The second pumpable slurry herein can comprise the activated ELS composition. A blender or mixer can be used for blending/mixing. The density of the liquid salt activator can be similar to the density of the first pumpable slurry. In embodiments, the density of the liquid salt activator is from about 80% to about 120% of the density of the first pumpable slurry, alternatively from about 85% to about 115%, or alternatively from about 90% to about 110%. In embodiments, the method 100 further comprises block 116, which comprises placing the activated ELS composition into a wellbore. The method 100 can further comprise block 118, which comprises allowing at least a portion of the activated ELS composition to set. Blocks 110 and 114 will be described in a later section.

The activated ELS composition can be prepared at any suitable location(s). Any step in the method of preparation can be at a location(s) remote from a wellsite or at a wellsite. With continued reference to FIG. 4, in embodiments, block 106 can be at a location remote from a wellsite. Block 108 can be at the same location as block 106, or a different remote location from a wellsite. In embodiments, the method 100 further comprises block 110, which comprises transporting the first pumpable slurry, the liquid salt activator, or both to the wellsite, prior to block 112. The first pumpable slurry, the liquid salt activator, or both can be stored in container(s) before being transported to the wellsite. Step(s) in block 112 can be at the wellsite. In embodiments, the liquid salt activator operates as an activator and/or accelerator to the first pumpable slurry (e.g., to activate and/or accelerate the setting of the ELS, set-delayed, or passivated cement composition). In such embodiments, after blending with the liquid salt activator, setting of the first pumpable slurry is activated and/or accelerated and the second pumpable slurry can be ready for use in a wellbore. In some embodiments, the wellsite is offshore. An offshore wellsite can have limited space, for example for storage of the first pumpable slurry and/or the liquid salt activator, and for blending the first pumpable slurry with the liquid salt activator.

Disclosed herein is a method of preparing an activated ELS composition of the type disclosed herein, comprising: (a) mixing components of an ELS composition using mixing equipment to form a first pumpable slurry; (b) preparing a liquid salt activator of the type disclosed herein, wherein (a), (b), or both (a) and (b) are at a locations) remote from a wellsite; (c) transporting the first pumpable slurry, the liquid salt activator, or both to the wellsite; and (d) blending the first pumpable slurry with the liquid salt activator to form a second pumpable slurry at the wellsite.

While the preceding may describe the use of the liquid salt composition as activators (e.g., a liquid salt activator) to an ELS composition (e.g., a set-delayed or passivated cement composition), it is to be understood that the liquid salt composition may be used in other cement compositions comprising a cementitious material and an aqueous fluid to accelerate or delay the sot time of the cement composition and to enhance or reduce the development of early compressive strength. As such, the liquid salt compositions of the type disclosed herein are not limited by, the term "activator" and can be referred to additionally or alternatively as liquid salt additive, liquid salt activator, liquid salt accelerator, liquid salt retarder, and the like, for example dependent upon the function of the liquid salt composition in a given cement composition as can be readily determined by a person of ordinary skill in the art (for example by comparing setting characteristics of a given cement composition in the presence and absence of a particular liquid salt composition). In some embodiments, the liquid salt composition may be used in a cement composition comprising a pozzolan and an aqueous fluid. In some embodiments, the liquid salt composition may be used in a cement composition comprising Portland cement and an aqueous fluid. In embodiments, the cement composition may further comprise one or more additives, such as those described above. The disclosure of the liquid salt composition used herein is not to be limited to ELS composition but may be used for any cement composition regardless of whether the cement composition may be categorized as "emended life."

Also, the activated ELS composition is one example of cementitious compositions, and the disclosed methods of preparing the activated ELS composition described herein can be applied for preparing any other cementitious composition (e.g., "regular" or non-set delayed cementitious compositions). The cementitious composition can comprise a cementitious material, an aqueous fluid, and the liquid salt composition. The cementitious material can comprise Portland cement, pozzolanic cement, gypsum cement, shale cement, acid/base cement, phosphate cement, high alumina content cement, slag cement, silica cement, high alkalinity cement, magnesia cement such as Sorel cements, fly ash cement, zeolite cement systems, cement kiln dust cement systems, slag cements, micro-fine cement, metakaolin, other settable materials, or combinations thereof. In embodiments, "high alkalinity cement" refers to a cement having a sodium oxide concentration in the range of from about 1.0 wt. % to about 2.0 wt. % by a weight of the high alkalinity cement. Shale cement refers to a cementitious material made from ground and burned shale.

In embodiments, the liquid salt composition operates as a retarder to the first pumpable slurry. Referring to FIG. 4, block 112 can be at a location remote from a wellsite. In such embodiments, the method 100 can further comprise block 114, which comprises transporting the second pumpable slurry to the wellsite, prior to block 116.

A cementitious composition of the type disclosed herein (e.g., an activated ELS composition) can be used as a cementitious fluid. A cementitious fluid refers to a material that can set and be used to permanently seal an annular space between casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is pumpable in relatively narrow annulus over long distances. Disclosed herein is a method of servicing a wellbore penetrating a subterranean formation. In embodiments, the method comprises placing a cementitious composition (e.g., an activated ELS composition) of the type disclosed herein into the wellbore.

In embodiments, the cementitious composition (e.g., activated ELS composition) is used in a subterranean workspace, for example in cementing underground pipe such as sewer pipe or wellbore casing. In embodiments, the cementitious composition is employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus (i.e., annular space) between the wall of the conduit and the wall of the wellbore. The drilling fluid may then be displaced down through the conduit and up through the annulus one or more times, for example, twice, to clean out the hole. The cementitious composition can then be conveyed (e.g., pumped) downhole and up through the annulus, thereby displacing the drilling fluid from the wellbore. In embodiments, the cementitious composition sets into a hard mass, which forms a cement column that isolates an adjacent portion of the subterranean formation and provides support to the adjacent conduit.

In some other embodiments, the cementitious composition (e.g., activated ELS composition) is employed in a secondary cementing operation such as squeeze cementing, which is performed after the primary cementing operation. In squeeze cementing, the cementitious composition can be forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones can be present in the cement column residing in the annulus, a wall of the conduit in the wellbore, a microannulus between the cement column and the subterranean formation, and/or a microannulus between the cement column and the conduit. The cementitious composition can set within the permeable zones, thereby forming a hard mass to plug those zones and prevent fluid from leaking therethrough.

Figure 5:
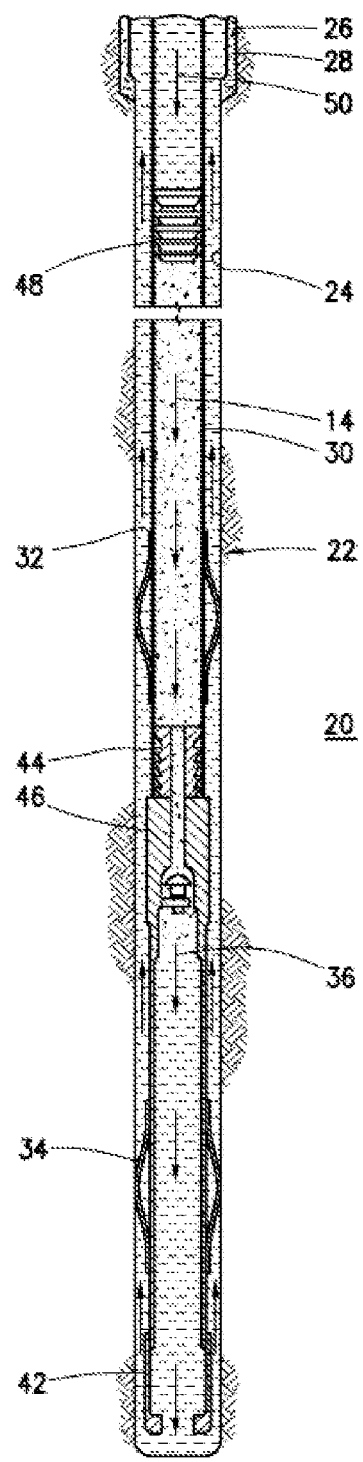
FIG. 5 is depiction of the placement of an activated extended life slurry (ELS) composition into a wellbore annulus in accordance with some embodiments of the disclosure.

Referring to FIG. 5, the cementitious composition (e.g., activated ELS composition) 14 of the type disclosed herein may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24 of the wellbore 22. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 can also be disposed in the wellbore 22. As illustrated, there is a wellbore annulus (i.e., annular space) 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 5, the cementitious composition 14 may be placed (e.g., pumped) down the interior of the casing 30. The cementitious composition 14 may be allowed to flow down the interior of the casing 30 through the casing shoe 42 at the bottom of the casing 30 and up around the casing 30 into the wellbore annulus 32. The cementitious composition 14 can be allowed to set in the wellbore annulus 32, for example, to form a cement sheath that supports and positions the casing 30 in the wellbore 22. Other techniques can also be utilized for introduction of the cementitious composition 14. By way of example, reverse circulation techniques may be used that includes introducing the cementitious composition 14 into the subterranean formation 20 by way of the wellbore annulus 32 instead of through the casing 30. In such embodiments, the method comprises circulating the cementitious composition 14 down through the wellbore annulus 32 and back up through the interior of the casing 30.

In embodiments, the cementitious composition 14 displaces other fluids 36, such as drilling fluids and/or spacer fluids that can be present in the interior of the casing 30 and/or the wellbore annulus 32. At least a portion of the displaced fluids 36 can exit the wellbore annulus 32 via a flow line and be deposited, for example, in one or more retention pits (e.g., a mud pit). A bottom plug 44 can be introduced into the wellbore 22 ahead of the cementitious composition 14, for example, to separate the cementitious composition 14 from the fluids 36 that can be inside the casing 30 prior to cementing. After the bottom plug 44 reaches the landing collar 46, a diaphragm or other suitable device can rupture to allow the cementitious composition 14 through the bottom plug 44. In FIG. 5, the bottom plug 44 is shown on the landing collar 46. In the illustrated embodiment, a top plug 48 may be introduced into the wellbore 22 behind the cementitious composition 14. The top plug 48 may separate the cementitious composition 14 from a displacement fluid 50 and also push the cementitious composition 14 through the bottom plug 44.

In embodiments, the method disclosed herein further comprises circulating the cementitious composition down through a conduit (e.g., casing) and back up through an annular space (also referred to as an annulus or a wellbore annulus) between an outside wall of the conduit and a wall of the wellbore. In some other embodiments, the method disclosed herein further comprises circulating the cementitious composition down through an annular space between an outside wall of a conduit and a wall of the wellbore and back up through the conduit. The method can further comprise allowing at least a portion of the cementitious composition to set.

Disclosed herein is a method of servicing a wellbore penetrating a subterranean formation. The method can comprise placing a cementitious composition (e.g., activated ELS composition) of the type disclosed herein into the wellbore, and allowing at least a portion of the cementitious composition to set. Also disclosed herein is a method of servicing a wellbore with a conduit (e.g., casing, production tubing, tubular, or other mechanical conveyance, etc.) disposed therein to form an annular space between a wellbore wall and an outer surface of the conduit. In embodiments, the method comprises placing a cementitious composition (e.g., activated ELS composition) of the type disclosed herein into at least a portion of the annular space, and allowing at least a portion of the cementitious composition to set.

In the method disclosed herein, placing a cementitious composition (e.g., activated ELS composition) into at least a portion of the annular space can be in different directions. In some embodiments, placing the cementitious composition comprises circulating the cementitious composition down through the conduit and back up through the annular space. In some other embodiments, placing the cementitious composition comprises circulating the cementitious composition down through the annular space and back up through the conduit. In embodiments, the conduit comprises casing.

In some embodiments, a liquid salt composition of the type disclosed herein (e.g., a liquid salt activator) can be a component of a multiphasic salt system (e.g., a multiphasic salt solution). In some embodiments, a multiphasic salt system (e.g., a suspension or slurry) comprises any of the liquid salt activator disclosed herein suspended in a saturated salt solution. In some embodiments, a multiphasic salt system (e.g., a suspension or slurry) comprises (i) a liquid salt activator comprising a salt, a suspending aid, and water, wherein the salt is present in the liquid salt activator in an amount of from about 5 wt. % to about 95 wt. %, based on the total weight of the liquid salt activator (ii) suspended in a saturated salt solution. The saturated salt solution used to form a multiphasic salt system can be a saturated aqueous solution comprising any suitable salt including without limitation monovalent salts such as sodium chloride; divalent salts such as calcium chloride; or any combination thereof in an amount effect to yield a saturated aqueous solution. The monovalent salt may be any salt that dissociates to form a monovalent cation, such as sodium and potassium salts. Specific examples of suitable monovalent salts include potassium sulfate and sodium sulfate. In some embodiments, the multiphasic salt system can be used in addition to or as an alternative to any of the uses of the liquid salt compositions disclosed herein (e.g., in addition to or as an alternative to a liquid salt activator of the type disclosed herein used to activate and/or accelerate setting of an ELS or set-delayed cement composition).

Various benefits may be realized by utilization of the presently disclosed methods and compositions. By incorporating a suspending aid as disclosed herein, the liquid salt activator can include an increased concentration of salt, thus the liquid salt activator can be added into a cement slurry in a reduced volume, which can improve blending of the liquid salt activator and a cement slurry, and can save space in storage and transportation.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Eleven liquid salt suspension samples were prepared, and then kept static in sample bottles at room temperature (about 70° F.) for about 7 weeks. Then the height of free fluid (i.e., fluid that separates from a fluid body that contains major amounts of salt) in each sample bottle was measured in a unit of mm, and volume percentage of the free fluid based on the total volume of each sample were calculated. The compositions of the samples and the results are shown in Table 1 below. Samples 3 and 6 were with compositions of the liquid salt activator of the type in the disclosure and had zero free fluid, which demonstrated a storage capability of the liquid salt activator.

TABLE 1

Compositions of liquid salt solutions

| Sample # | Salt (g) | Suspending aid (g) | Water (g) | Free fluid (FF) (mm) | % FF |
|---|---|---|---|---|---|
| 1 | 176.0 | 7.0 | 220.0 | 24.9 | 56.2 |
| 2 | 236.4 | 9.5 | 195.0 | 6.5 | 14.6 |
| 3 | 350.0 | 14.0 | 140.0 | 0.0 | 0.0 |
| 4 | 350.0 | 8.8 | 140.0 | 12.3 | 27.8 |
| 5 | 176.0 | 4.4 | 220.0 | 27.0 | 61.0 |
| 6 | 355.0 | 11.5 | 142.0 | 0.0 | 0.0 |
| 7 | 176.0 | 5.7 | 220.0 | 23.4 | 53.0 |
| 8 | 229.4 | 5.7 | 200.0 | 21.6 | 48.9 |
| 9 | 242.4 | 7.9 | 200.0 | 16.1 | 36.5 |
| 10 | 333.3 | 13.3 | 200.0 | 16.0 | 32.0 |
| 11 | 400.0 | 14.0 | 200.0 | 15.0 | 28.8 |

Example 2

A base cement slurry with a density of 14.5 lb/gal was prepared per API procedures. At the same time salt activator samples A2 and A3 were also prepared. Compositions of the base cement slurry and the salt activator samples are listed in Tables 2 and 3, respectively. A2 was used as a control, which was a dissolved solution of salt and a weighting agent was added to maintain a density approximate the same as the base cement slurry. A3 was a liquid salt activator of the type disclosed in this disclosure. In A3, without being limited by theory, a portion of the salt(s) was dissolved in the water, and once the solubility limit for each salt was reached, a portion of the salt(s) was suspended in the water with the help of the suspending aid.

A shelf life herein is defined as the length of time a product may be stored without becoming unsuitable for use (e.g., sedimentation of salt in the liquid salt activator). A shelf life of a cementitious composition can be increased or decreased by including different amounts of components (e.g., retarders, hydraulic cement) in the cementitious composition. A "measured" shelf life in Tables 2 and 3 were the value measured in the experiment, and does not limit the value of the shelf life if measured in a shorter or longer period of time in a different experiment. The shelf life of a cementitious composition (e.g., an ELS composition) can be any suitable time such as greater than about 6 days. In embodiments, the shelf life is from about 6 days to about 2 years, alternatively from about 6 days to about 1 year, alternatively from about 6 days to about 180 days, or alternatively from about 6 days to about 90 days. The shelf life of a liquid salt activator can be greater than about 7 days, alternatively from about 7 days to about 2 years, or alternatively from about 7 days to about 1 year.

TABLE 2

Composition of base cement slurry

| Component | % bwob |
|---|---|
| Cementitious components (hydraulic cement, supplementary cementitious material, etc.) | 100.0 |
| Defoamer | 0.20 |
| Water | 45.0 |
| Weighting Agent | 3.0 |
| Cement retarder | 0.5 |
| Suspending aid 1 | 0.004 |
| Measured shelf life | 6 days |

TABLE 3

Composition of salt activator samples

| Component | A2 wt. % | A3 wt. % |
|---|---|---|
| Salt(s) | 15.4 | 69.4 |
| Weighting Agent | 46.3 | — |
| Suspending aid 2 | — | 2.8 |
| Water | 38.3 | 27.8 |
| Density (ppg) | 14.5 | 14.1 |
| Measured shelf life | >2 months | 7 days |

After preparation, both the base cement slurry and the salt activator samples were stored at room temperature for at least 48 hours. Then the base cement slurry was mixed with A2 and A3, respectively. 800.0 g of the base cement slurry was placed in a blender and circulated at 2000 rpm, while 478.9 g of A2 was slowly poured into the blender. The mixture of the base cement slurry and A2 was blended at 2000 rpm for 30 seconds and then removed and placed in consistometer and UCA test cells, respectively. After blending the mixture was referred to as "cement-A2 slurry", which was an activated slurry. Density of the cement-A2 slurry was measured as 14.5 ppg using a pressurized mud balance.

800.0 g of the base cement slurry was placed in a blender and circulated at 2000 rpm, while 105.7 g of A3 was slowly poured into the blender. The mixture of the base cement slurry and A3 was blended at 2000 rpm for 30 seconds and then removed and placed in consistometer and UCA test cells, respectively. After blending the mixture was referred to as "cement-A3 slurry", which was an activated slurry. Density of the cement-A3 slurry was measured as 14.4 ppg using a pressurized mud balance.

Thickening time was measured in consistometer in accordance with test standard API-RP-10B-2. Thickening time and other results are listed in Table 4 below.

TABLE 4

Test results

| Activated slurry | Salt activator sample | Activated slurry density (ppg) | Salt (% bwob, by weight of dry blend) | Vol. % of Salt activator sample based on volume of the base cement slurry | Fluid loss additive % bwob | Thickening time at 130° F. (hh:mm) |
|---|---|---|---|---|---|---|
| Cement-A2 slurry | A2 | 14.5 | 10.0 | 30.4 | — | 5:06 |
| Cement-A3 slurry | A3 | 14.4 | 10.0 | 9.1 | 0.40 | 6:31 |

As shown in Table 4, for the same amount of activating species (i.e., salts)—both at 10.0% bwob (by weight of dry blend), the volume of added salt activator sample is less for the liquid salt activator (A3). Additionally, without being limited by theory, due to the higher salt concentration and lower amount of water, the liquid salt activator (A3) does not require the addition of a weighting agent to compensate for the extra water and to maintain the density of the activated slurry similar to the density of the base cement slurry. Furthermore, in the field (e.g., at a wellsite), to obtain the same performance, much lower volumes of the liquid salt activator will have to be prepared, shipped, and stored. This would be especially beneficial in offshore operations where space is at a premium.

Figure 2:
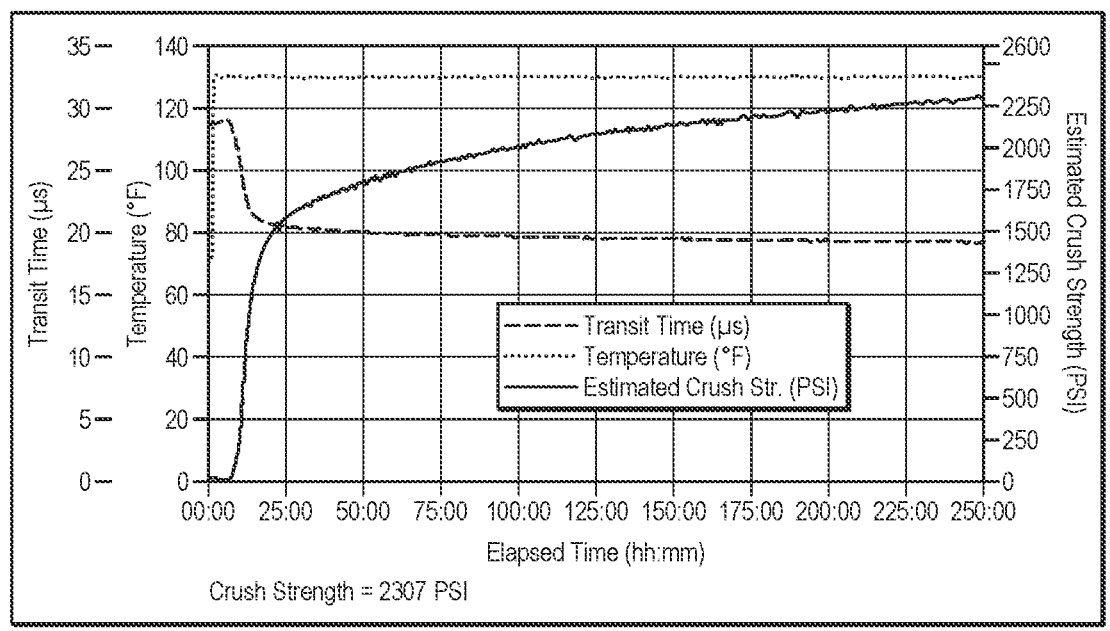
FIG. 2 is an ultrasonic cement analyzer (UCA) chart of a sample in accordance with some embodiments of the disclosure.

As shown in Table 4, the thickening time of the cement-A2 slurry was shorter than the cement-A3 slurry. According to the UCA charts of the cement-A2 slurry and the cement-A3 slurry in FIGS. 1 and 2, respectively, the time to 50 psi of the cement-A2 slurry was about 6.0 hours, shorter than that of the cement-A3 slurry, which was about 8.0 hours. However, the overall strength development of the cement-A3 slurry was higher and faster than that of the cement-A2 slurry, for example the 24-hour compressive strength for the cement-A2 slurry was about 850 psi and for the cement-A3 slurry it was about 1600 psi. Furthermore, once the UCA test was completed, the activated slurry samples were removed from UCA cells and crushed in a Tinius-Olsen loadframe, where the cement-A3 slurry had a crush strength of 2307 psi while the cement-A2 slurry had a crush strength of 1317 psi.

ADDITIONAL DISCLOSURE

The following is provided as additional disclosure for combinations of features and embodiments of the present disclosure.

A first embodiment, which is a liquid salt activator comprising a salt, a suspending aid, and water, wherein the salt is present in the liquid salt activator in an amount of from about 5 wt. % to about 95 wt. %, based on the total weight of the liquid salt activator.

A second embodiment, which is the liquid salt activator of the first embodiment, wherein the salt comprises chloride, sulfate, phosphate, bromide, bicarbonate, acetate, formate, and carbonate salts of lithium, potassium, sodium, calcium, magnesium, zinc, and iron, or combinations thereof.

A third embodiment, which is the liquid salt activator of the first or the second embodiment, wherein the salt comprises sodium chloride and sodium sulfate.

A fourth embodiment, which is the liquid salt activator of the third embodiment, wherein the weight ratio of sodium chloride to sodium sulfate is from about 1:9 to about 9:1.

A fifth embodiment, which is the liquid salt activator of any of the first through the fourth embodiments, wherein the suspending aid comprises a synthetic polymer, a biopolymer, or a combination thereof.

A sixth embodiment, which is the liquid salt activator of any of the first through the fifth embodiments, wherein the suspending aid comprises a water-soluble polymer.

A seventh embodiment, which is the liquid salt activator of any of the first through the sixth embodiments, wherein the suspending aid comprises a copolymer of 2-Acrylamido-2-methyl propane sulfonic acid (AMPS).

An eighth embodiment, which is the liquid salt activator of any of the first through the seventh embodiments, wherein the suspending aid has an average molecular weight of from equal to or greater than about 50,000 Daltons (Da) to equal to or less than about 5,000,000 Da.

A ninth embodiment, which is the liquid salt activator of any of the first through the eighth embodiments, wherein the suspending aid is present n the liquid salt activator in an amount of from about 0.05 wt. % to about 20.0 wt. %, based on the total weight of the liquid salt activator.

A tenth embodiment, which is the liquid salt activator of any of the first through the ninth embodiments, wherein the water comprises water selected from the group consisting of fresh water, surface water, ground water, salt water, brine, sea water, produced water, and any combination thereof.

An eleventh embodiment, which is the liquid salt activator of any of the first through the tenth embodiments, wherein the water is present in the liquid salt activator in an amount of from about 5 wt. % to about 95 wt. %, based on the total weight of the liquid salt activator.

A twelfth embodiment, which is the liquid salt activator of any of the first through the eleventh embodiments, having a density of from about 9 lb/gal to about 25 lb gal.

A thirteenth embodiment, which is the liquid salt activator of any of the first through the twelfth embodiments, having a free fluid in a range of from about 0 vol. % to about 10 vol. % based on the total volume of the liquid salt activator, after being static at about 70° F. for about 1 week to about seven weeks.

A fourteenth embodiment, which is an activated extended life slurry (ELS) composition comprising: a hydraulic cement, a supplementary cementitious material, an aqueous fluid, and the liquid salt activator of any of the first through the thirteenth embodiments.

A fifteenth embodiment, which is the activated ELS composition of the fourteenth embodiment, wherein the hydraulic cement is selected from the group consisting of Portland cements, pozzolana cements, gypsum cements, high alumina content cements, silica cements, and combinations thereof.

A sixteenth embodiment, which is the activated ELS composition of the fourteenth or the fifteenth embodiment, wherein the supplementary cementitious material is selected from the group consisting of fly ash, blast furnace slag, silica fume, pozzolans, kiln dust, clays, and combinations thereof.

A seventeenth embodiment, which is the activated ELS composition of any of the fourteenth through the sixteenth embodiments, further comprising hydrated lime.

An eighteenth embodiment, which is the activated ELS composition of any of the fourteenth through the seventeenth embodiments, having a thickening time to reach about 70 Bearden units of consistency (Bc) in a range of from about 6 hours to about 10 hours at about 130° F. and 3,000 psi, when measured in accordance with test standard API-RP-10B-2.

A nineteenth embodiment, which is the activated ELS composition of any of the fourteenth through the eighteenth embodiments, having a time to reach 50 psi compressive strength in a range of from about 8 hours to about 20 hours at about 160° F., when measured in accordance with test standard API-RP-10B-2.

A twentieth embodiment, which is the activated ELS composition of any of the fourteenth through the nineteenth embodiments, having a 24-hour compressive strength in a range of from about 1,000 psi to about 5,000 psi at about 160° F., when measured in accordance with test standard API-RP-10B-2.

A twenty-first embodiment, which is the activated ELS composition of any of the fourteenth through the twentieth embodiments, wherein the liquid salt activator is present in the activated ELS composition in an amount of from about 0.001 wt. % to about 50 wt. %, based on the total weight of the activated ELS composition.

A twenty-second embodiment, which is the activated ELS composition of any of the fourteenth through the twenty-first embodiments, wherein the hydraulic cement is present in the activated ELS composition in an amount of from about 10% by weight of dry blend (bwob) to about 80% bwob, based on the total weight of dry blend of the activated ELS composition.

A twenty-third embodiment, which is the activated ELS composition of any of the fourteenth through the twenty-second embodiments, wherein the supplementary cementitious material is present in the activated ELS composition in an amount of from about 0.1% bwob to about 80% bwob, based on the total weight of dry blend of the activated ELS composition.

A twenty-fourth embodiment, which is the activated ELS composition of any of the fourteenth through the twenty-third embodiments, wherein the aqueous fluid comprises fresh water, surface water, ground water, salt water, brine, sea water, produced water, or combinations thereof.

A twenty-fifth embodiment, which is the activated ELS composition of any of the fourteenth through the twenty-fourth embodiments, wherein the aqueous fluid is present in the activated ELS composition in an amount of from about 33% by weight of dry blend (bwob) to about 200% bwob, based on the total weight of dry blend of the activated ELS composition.

A twenty-sixth embodiment, which is the activated ELS composition of any of the seventeenth through the twenty-fifth embodiments, wherein a weight ratio of the supplementary cementitious material to the hydrated lime present in the activated ELS composition is in a range of from about 10:1 to about 1:1.

A twenty-seventh embodiment, which is the activated ELS composition of any of the fourteenth through the twenty-sixth embodiments, further comprising one or more additives.

A twenty-eighth embodiment, which is the activated ELS composition of the twenty-seventh embodiment, wherein the one or more additives comprise weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, dispersants, thixotropic additives, suspending agents, or combinations thereof.

A twenty-ninth embodiment, which is the activated ELS composition of the twenty-seventh or the twenty-eighth embodiment, wherein the one or more additives are present in the activated ELS composition in an amount of from about 0.01% bwob to about 25% bwob based on the total weight of dry blend of the activated ELS composition.

A thirtieth embodiment, which is the activated ELS composition of any of the fourteenth through the twenty-ninth embodiments, having a density of from about 4.0 lb/gal to about 25.0 lb/gal.

A thirty-first embodiment, which is a cementitious composition comprising a cementitious material, the liquid salt activator of any of the first through the thirteenth embodiments, and an aqueous fluid.

A thirty-second embodiment, which is the cementitious composition of the thirty-first embodiment, wherein the liquid salt activator is present in the cementitious composition in an amount of from about 0.5% by weight of dry blend (bwob) to about 50% bwob, based on the total weight of the cementitious material.

A thirty-third embodiment, which is the cementitious composition of the thirty-first or the thirty-second embodiment, wherein the cementitious material comprises Portland cement, pozzolanic cement, gypsum cement, shale cement, acid/base cement, phosphate cement, high alumina content cement, slag cement, silica cement, high alkalinity cement, magnesia cement, fly ash cement, zeolite cement systems, cement kiln dust cement systems, slag cements, micro-fine cement, metakaolin, other settable materials, or combinations thereof.

A thirty-fourth embodiment, which is the cementitious composition of any of the thirty-first through the thirty-third embodiments, wherein the cementitious material comprises Portland cement and pozzolanic cement.

A thirty-fifth embodiment, which is the cementitious composition of the thirty-fourth embodiment, wherein the weight ratio of Portland cement to pozzolanic cement is from about 1:4 to about 4:1.

A thirty-sixth embodiment, which is the cementitious composition of any of the thirty-first through the thirty-fifth embodiments, wherein the cementitious material is present in the cementitious composition in an amount of from about 10 wt. % to about 85 wt. % based on the total weight of the cementitious composition.

A thirty-seventh embodiment, which is the cementitious composition of any of the thirty-first through the thirty-sixth embodiments, wherein the aqueous fluid comprises fresh water, surface water, ground water, salt water, brine, sea water, produced water, or combinations thereof.

A thirty-eighth embodiment, which is the cementitious composition of any of the thirty-first through the thirty-seventh embodiments, wherein the aqueous fluid is present in the cementitious composition in an amount of from about 33% by weight of dry blend (bwob) to about 200% bwob, based on the total weight of the cementitious composition.

A thirty-ninth embodiment, which is the cementitious composition of any of the thirty-first through the thirty-eighth embodiments, further comprising one or more additives.

A fortieth embodiment, which is the cementitious composition of the thirty-ninth embodiment, wherein the one or more additives comprise weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, dispersants, thixotropic additives, suspending agents, or combinations thereof.

A forty-first embodiment, which is the cementitious composition of the thirty-ninth or the fortieth embodiment, wherein the one or more additives are present in the cementitious composition in an amount of from about 0.01% bwob to about 25% bwob based on the total weight of the cementitious material.

A forty-second embodiment, which is the cementitious composition of any of the thirty-first through the forty-first embodiments, having a density of from about 4.0 lb/gal to about 25.0 lb/gal.

A forty-third embodiment, which is a method of preparing a liquid salt activator, comprising: placing components of the liquid salt activator into a container, wherein the liquid salt activator comprises a salt, a suspending aid, and water, wherein the salt is present in the liquid salt activator in an amount of from about 5 wt. % to about 95 wt. %, based on the total weight of the liquid salt activator; and blending the components of the liquid salt activator to form a pumpable slurry.

A forty-fourth embodiment, which is a method of preparing a cementitious composition, comprising: mixing components of the cementitious composition using mixing equipment to form a first pumpable slurry, wherein the cementitious composition comprises a cementitious material and an aqueous fluid; preparing a liquid salt activator, wherein the liquid salt activator comprises a salt, a suspending aid, and water, wherein the salt is present in the liquid salt activator in an amount of from about 5 wt. % to about 95 wt. %, based on the total weight of the liquid salt activator; and blending the first pumpable slurry with the liquid salt activator to form a second pumpable slurry.

A forty-fifth embodiment, which is the method of the forty-fourth embodiment, wherein the shelf life of the first pumpable slurry is from about 6 days to about 90 days.

A forty-sixth embodiment, which is the method of any of the forty-fourth or the forty-fifth embodiment, wherein the thickening time of the second pumpable slurry to reach about 70 Bearden units of consistency (Bc) is in a range of from about 6 hours to about 10 hours at about 130 when measured in accordance with test standard API-RP-10B-2.

A forty-seventh embodiment, which is the method of any of the forty-fourth through the forty-sixth embodiments, wherein the time to reach 50 psi compressive strength of the second pumpable slurry is in a range of from about 8 hours to about 20 hours at about 160° F., when measured in accordance with test standard API-RP-10B-2.

A forty-eighth embodiment, which is the method of any of the forty-fourth through the forty-seventh embodiments, wherein the 24-hour compressive strength of the second pumpable slurry is in a range of from about 1,000 psi to about 5,000 psi at about 160 when measured in accordance with test standard API-RP-10B-2.

A forty-ninth embodiment, which is the method of the forty-fourth embodiment, wherein the cementitious material comprises Portland cement.

A fiftieth embodiment, which is the method of the forty-ninth embodiment, wherein the liquid salt activator is present in the second pumpable slurry in an amount of from about 8% bwob to about 50% bwob, based on the total weight of the cementitious material.

A fifty-first embodiment, which is the method of the forty-ninth or the fiftieth embodiment, wherein the ratio of the thickening time of the second pumpable slurry to the thickening time of the first pumpable slurry to reach about 70 Bc is in a range of from about 1.2 to about 10 at about 130° F., when measured in accordance with test standard API-RP-10B-2.

A fifty-second embodiment, which is the method of any of the forty-ninth through the fifty-first embodiments, wherein the ratio of the time to reach 50 psi compressive strength of the second pumpable slurry to the time to reach 50 psi compressive strength of the first pumpable slurry is in a range of from about 1,2 to about 10 at about 160° F., when measured in accordance with test standard API-RP-10B-2.

A fifty-third embodiment, which is the method of any of the forty-fourth through the fifty-second embodiments, wherein (a) mixing the components of the cementitious composition, (b) preparing the liquid salt activator, or both (a) and (b) are at a location(s) remote from a wellsite.

A fifty-fourth embodiment, which is the method of the fifty-third embodiment, further comprising transporting the first pumpable slurry, the liquid salt activator, or both to the wellsite, prior to blending the first pumpable slurry with the liquid salt activator.

A fifty-fifth embodiment, which is the method of the fifty-third or the fifty-fourth embodiment, wherein blending the first pumpable slurry with the liquid salt activator is at the wellsite.

A fifty-sixth embodiment, which is the method of the fifty-third embodiment, wherein blending the first pumpable slurry with the liquid salt activator is at a location remote from the wellsite.

A fifty-seventh embodiment, which is the method of the fifty-sixth embodiment, further comprising transporting the second pumpable slurry to the wellsite after blending the first pumpable slurry with the liquid salt activator.

A fifty-eighth embodiment, which is a method of preparing a cementitious composition, comprising: (a) mixing components of the cementitious composition using mixing equipment to form a first pumpable slurry, wherein the cementitious composition comprises a cementitious material and an aqueous fluid; (b) preparing a liquid salt activator, wherein the liquid salt activator comprises a salt, a suspending aid, and water, wherein the salt is present in the liquid salt activator in an amount of from about 5 wt. % to about 95 wt. %, based on the total weight of the liquid salt activator, and wherein (a), (b), or both (a) and (b) are at a location(s) remote from a (c) transporting the first pumpable slurry, the liquid salt activator, or both to the wellsite; and (d) blending the first pumpable slurry with the liquid salt activator to form a second pumpable slurry at the wellsite.

A fitly-ninth embodiment, which is a method of servicing a wellbore penetrating a subterranean formation, comprising: placing a cementitious composition into the wellbore, wherein the cementitious composition comprises a cementitious material, a liquid salt activator, and an aqueous fluid, wherein the liquid salt activator comprises a salt, a suspending aid, and water, wherein the salt is present in the liquid salt activator in an amount of from about 5 wt. % to about 95 wt. %, based on the total weight of the liquid salt activator.

A sixtieth embodiment, which is the method of the fifty-ninth embodiment, further comprising circulating the cementitious composition down through a conduit and back up through an annular space between an outside wall of the conduit and a wall of the wellbore.

A sixty-first embodiment, which is the method of the fifty-ninth embodiment, further comprising circulating the cementitious composition down through an annular space between an outside wall of a conduit and a wall of the wellbore and back up through the conduit.

A sixty-second embodiment, which is the method of any of the fifty-ninth through the sixty-first embodiments, further comprising allowing at least a portion of the cementitious composition to set.

A sixty-third embodiment, which is a method of servicing a wellbore penetrating a subterranean formation, comprising: placing a cementitious composition into the wellbore, wherein the cementitious composition comprises a cementitious material, a liquid salt activator, and an aqueous fluid, wherein the liquid salt activator comprises a salt, a suspending aid, and water, wherein the salt is present in the liquid salt activator in an amount of from about 5 wt. % to about 95 wt. %, based on the total weight of the liquid salt activator; and allowing at least a portion of the cementitious composition to set.

A sixty-fourth embodiment, which is a method of servicing a wellbore with a conduit disposed therein to form an annular space between a wellbore wall and an outer surface of the conduit, comprising: placing a cementitious composition into at least a portion of the annular space, wherein the cementitious composition comprises a cementitious material, a liquid salt activator, and an aqueous fluid, wherein the liquid salt activator comprises a salt, a suspending aid, and water, wherein the salt is present in the liquid salt activator in an amount of from about 5 wt. % to about 95 wt. %, based on the total weight of the liquid salt activator; and allowing at least a portion of the cementitious composition to set.

A sixty-fifth embodiment, which is the method of the sixty-fourth embodiment, wherein placing the cementitious composition into at least a portion of the annular space comprises: circulating the cementitious composition down through the conduit and back up through the annular space.

A sixty-sixth embodiment, which is the method of the sixty-fourth embodiment, wherein placing the cementitious composition into at least a portion of the annular space comprises: circulating the cementitious composition down through the annular space and back up through the conduit.

A sixty-seventh embodiment, which is the method of any of the sixty-fourth through the sixty-sixth embodiments, wherein the conduit comprises casing.

A sixty-eighth embodiment, which is a multiphasic salt system (e.g., a suspension or slurry) comprising the liquid salt activator of any of the liquid salt activator of any of the first through the thirteenth embodiments suspended in a saturated salt solution.

A sixty-ninth embodiment which is a liquid salt activator for an extended life cementitious slurry (ELS) comprising a salt, a suspending aid, and water, wherein the salt is present in the liquid salt activator in an amount of from about 5 wt. % to about 95 wt. %, based on the total weight of the liquid salt activator.

A seventieth embodiment which is an activated extended life cementitious slurry (ELS) composition comprising: a hydraulic cement, an aqueous fluid, and a liquid salt activator comprising a salt, a suspending aid, and water, wherein the salt is present in the liquid salt activator in an amount of from about 5 wt. % to about 95 wt. %, based on the total weight of the liquid salt activator.

A seventy-first embodiment which is a cementitious composition comprising a cementitious material, a liquid salt activator comprising a salt, a suspending aid, and water, wherein the salt is present in the liquid salt activator in an amount of from about 5 wt. % to about 95 wt. %, based on the total weight of the liquid salt activator, and an aqueous fluid.

A seventy-second embodiment which is a multiphasic salt system comprising a liquid salt activator comprising a salt, a suspending aid, and water, wherein the salt is present in the liquid salt activator in an amount of from about 5 wt. % to about 95 wt. %, based on the total weight of the liquid salt activator, wherein the liquid salt additive is suspended in a saturated salt solution.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A liquid salt activator for an extended life cementitious slurry (ELS) consisting essentially of (i) a salt, (ii) a suspending aid wherein the suspending aid is a polymer product of one or more monomers selected from the group consisting of vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamide-2-tert-butyl sulfonic acid (ATBS), N,N-dimethylaniline, pentaerythritol allyl ether, methylenebisacrylamide, divinyl ether, diallyl ether, vinyl ethers of polyglycols, vinyl ethers of polyols, allyl ethers of polyglycols, allyl ethers of polyols, divinylbenzene, 1,3-divinylimidazolidin-2-one, divinyltetrahydro-pyrimidin-2 (1H)-one, dienes, allyl-amines, N-vinyl-3 (E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, diallyldimethylammonium chloride, epihalohydrin, epichlorohydrin, diepoxides, dialdehydes, trimethylolpropane triacrylate, pentaerythritol tetraacrylate, divinylsulphone, carbodiimide, glutaraldehyde, acryloylmorpholine, N-vinyl-N-methylacetamide, N-vinylformamide, N-vinylpyrrolidone, acrylonitrile, acetylomorpholine, and maleic anhydride, and (iii) water, wherein the salt comprises a cation and an anion selected from the group consisting of chloride, sulfate, bromide, bicarbonate, acetate, formate, carbonate, lithium, potassium, sodium, calcium, magnesium, zinc, or iron, and combinations thereof; wherein the salt is present in the liquid salt activator in an amount of from about 5 wt. % to about 95 wt. %, based on the total weight of the liquid salt activator; wherein the liquid salt activator has free fluid in a range of from about 0.1 vol. % to about 10 vol. % based on the total volume of the liquid salt activator, after being static at about 70° F. for about 1 week to about seven weeks and wherein the liquid salt activator excludes phosphate.

2. The liquid salt activator of claim 1, wherein the salt comprises sodium chloride and sodium sulfate.

3. The liquid salt activator of claim 2, wherein the weight ratio of sodium chloride to sodium sulfate is from about 1:9 to about 9:1.

4. The liquid salt activator of claim 1, wherein the suspending aid comprises a copolymer of 2-Acrylamido-2-methyl propane sulfonic acid (AMPS).

5. The liquid salt activator of claim 1, wherein the suspending aid has an average molecular weight of from equal to or greater than about 50,000 Daltons (Da) to equal to or less than about 5,000,000 Da.

6. The liquid salt activator of claim 1, wherein the suspending aid is present in the liquid salt activator in an amount of from about 0.05 wt. % to about 20.0 wt. %, based on the total weight of the liquid salt activator.

7. The liquid salt activator of claim 1, wherein the water comprises water selected from the group consisting of fresh water, surface water, ground water, salt water, brine, sea water, produced water, and any combination thereof.

8. The liquid salt activator of claim 1, wherein the water is present in the liquid salt activator in an amount of from about 5 wt. % to about 95 wt. %, based on the total weight of the liquid salt activator.

9. The liquid salt activator of claim 1, having a density of from about 9 lb/gal to about 25 lb/gal.

10. An activated extended life cementitious slurry (ELS) composition comprising: a hydraulic cement, an aqueous fluid, and a liquid salt activator consisting essentially of (i) a salt, (ii) a suspending aid wherein the suspending aid is a polymer product of one or more monomers selected from the group consisting of vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamide-2-tert-butyl sulfonic acid (ATBS), N,N-dimethylaniline, pentaerythritol allyl ether, methylenebisacrylamide, divinyl ether, diallyl ether, vinyl ethers of polyglycols, vinyl ethers of polyols, allyl ethers of polyglycols, allyl ethers of polyols, divinylbenzene, 1,3-divinylimidazolidin-2-one, divinyltetrahydro-pyrimidin-2 (1H)-one, dienes, allyl-amines, N-vinyl-3 (E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, diallyldimethylammonium chloride, epihalohydrin, epichlorohydrin, diepoxides, dialdehydes, trimethylolpropane triacrylate, pentaerythritol tetraacrylate, divinylsulphone, carbodiimide, glutaraldehyde, acryloylmorpholine, N-vinyl-N-methylacetamide, N-vinylformamide, N-vinylpyrrolidone, acrylonitrile, acetylomorpholine, and maleic anhydride, and (iii) water, wherein the salt comprises a cation and an anion selected from the group consisting of chloride, sulfate, bromide, bicarbonate, acetate, formate, carbonate, lithium, potassium, sodium, calcium, magnesium, zinc, or iron, and combinations thereof; wherein the salt is present in the liquid salt activator in an amount of from about 5 wt. % to about 95 wt. %, based on the total weight of the liquid salt activator; wherein the liquid salt activator has free fluid in a range of from about 0.1 vol. % to about 10 vol. % based on the total volume of the liquid salt activator, after being static at about 70° F. for about 1 week to about seven weeks; and wherein the liquid salt activator excludes phosphate.

11. The activated ELS composition of claim 10, wherein the hydraulic cement is selected from the group consisting of Portland cements, pozzolana cements, gypsum cements, high alumina content cements, silica cements, and combinations thereof.

12. The activated ELS composition of claim 10, further comprising a supplementary cementitious material.

13. The activated ELS composition of claim 12, wherein the supplementary cementitious material is selected from the group consisting of fly ash, blast furnace slag, silica fume, pozzolans, kiln dust, clays, and combinations thereof.

14. The activated ELS composition of claim 10, further comprising hydrated lime.

15. The activated ELS composition of claim 10, wherein the liquid salt activator is present in the activated ELS composition in an amount of from about 0.001 wt. % to about 50 wt. %, based on the total weight of the activated ELS composition.

16. The activated ELS composition of claim 10, wherein the salt comprises sodium chloride and sodium sulfate.

17. A cementitious composition comprising a cementitious material, a liquid salt activator consisting essentially of (i) a salt, (ii) a suspending aid wherein the suspending aid is a polymer product of one or more monomers selected from the group consisting of vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamide-2-tert-butyl sulfonic acid (ATBS), N,N-dimethylaniline, pentaerythritol allyl ether, methylenebisacrylamide, divinyl ether, diallyl ether, vinyl ethers of polyglycols, vinyl ethers of polyols, allyl ethers of polyglycols, allyl ethers of polyols, divinylbenzene, 1,3-divinylimidazolidin-2-one, divinyltetrahydro-pyrimidin-2 (1H)-one, dienes, allyl-amines, N-vinyl-3 (E)-ethylidene pyrrolidone, ethylidene bis(N-vinylpyrrolidone), N-substituted acrylamides, methacrylamides, acrylates, methacrylamide, N-substituted methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, diallyldimethylammonium chloride, epihalohydrin, epichlorohydrin, diepoxides, dialdehydes, trimethylolpropane triacrylate, pentaerythritol tetraacrylate, divinylsulphone, carbodiimide, glutaraldehyde, acryloylmorpholine, N-vinyl-N-methylacetamide, N-vinylformamide, N-vinylpyrrolidone, acrylonitrile, acetylomorpholine, and maleic anhydride, and (iii) water, wherein the salt comprises a cation and an anion selected from the group consisting of chloride, sulfate, bromide, bicarbonate, acetate, formate, carbonate, lithium, potassium, sodium, calcium, magnesium, zinc, or iron, and combinations thereof, wherein the salt is present in the liquid salt activator in an amount of from about 5 wt. % to about 95 wt. %, based on the total weight of the liquid salt activator, and an aqueous fluid; wherein the liquid salt activator has free fluid in a range of from about 0.1 vol. % to about 10 vol. % based on the total volume of the liquid salt activator, after being static at about 70° F. for about 1 week to about seven weeks; and wherein the liquid salt activator excludes phosphate.

18. The cementitious composition of claim 17, wherein the liquid salt activator is present in the cementitious composition in an amount of from about 0.5% by weight of dry blend (bwob) to about 50% bwob, based on the total weight of the cementitious material.

19. A multiphasic salt system comprising a liquid salt activator consisting essentially of (i) a salt, (ii) a suspending aid wherein the suspending aid is a polymer product of one or more monomers selected from the group consisting of vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamide-2-tert-butyl sulfonic acid (ATBS), N,N-dimethylaniline, pentaerythritol allyl ether, methylenebisacrylamide, divinyl ether, diallyl ether, vinyl ethers of polyglycols, vinyl ethers of polyols, allyl ethers of polyglycols, allyl ethers of polyols, divinylbenzene, 1,3-divinylimidazolidin-2-one, divinyltetrahydro-pyrimidin-2 (1H)-one, dienes, allyl-amines, N-vinyl-3 (E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, diallyldimethylammonium chloride, epihalohydrin, epichlorohydrin, diepoxides, dialdehydes, trimethylolpropane triacrylate, pentaerythritol tetraacrylate, divinylsulphone, carbodiimide, glutaraldehyde, acryloylmorpholine, N-vinyl-N-methylacetamide, N-vinylformamide, N-vinylpyrrolidone, acrylonitrile, acetylomorpholine, and maleic anhydride, and (iii) water, wherein the salt comprises a cation and an anion selected from the group consisting of chloride, sulfate, bromide, bicarbonate, acetate, formate, carbonate, lithium, potassium, sodium, calcium, magnesium, zinc, or iron, and combinations thereof, wherein the salt is present in the liquid salt activator in an amount of from about 5 wt. % to about 95 wt. %, based on the total weight of the liquid salt activator, wherein the liquid salt additive is suspended in a saturated salt solution; wherein the liquid salt activator has free fluid in a range of from about 0.1 vol. % to about 10 vol. % based on the total volume of the liquid salt activator, after being static at about 70° F. for about 1 week to about seven weeks; and wherein the liquid salt activator excludes phosphate.

20. The multiphasic salt system of claim 19, wherein the salt comprises sodium chloride and sodium sulfate.

21. The multiphasic salt system of claim 20, wherein the weight ratio of sodium chloride to sodium sulfate is from about 1:9 to about 9:1.

22. The activated ELS composition of claim 21, wherein the weight ratio of sodium chloride to sodium sulfate is from about 1:9 to about 9:1.

\* \* \* \* \*